United States Patent [19]

Kumahara et al.

[11] 4,208,715
[45] Jun. 17, 1980

[54] DUAL DATA PROCESSING SYSTEM

[75] Inventors: Mitsuo Kumahara, Hamura; Takatoshi Ishii, Oume, both of Japan

[73] Assignee: Tokyo Shibaura Electric Co., Ltd., Kawasaki, Japan

[21] Appl. No.: 892,127

[22] Filed: Mar. 31, 1978

[30] Foreign Application Priority Data

Mar. 31, 1977 [JP] Japan .................................. 52/35470

[51] Int. Cl.² ...................... G06F 11/06; G06F 3/02; G06F 15/16
[52] U.S. Cl. ......................................... 364/200; 371/9
[58] Field of Search .................. 364/200 MS File; 235/303, 303.3, 303.4

[56] References Cited

U.S. PATENT DOCUMENTS

| 3,200,380 | 8/1965 | MacDonald | 364/200 |
|---|---|---|---|
| 3,252,149 | 5/1966 | Weida | 364/200 |
| 3,654,603 | 4/1972 | Gunning | 235/303.3 |
| 3,768,074 | 10/1973 | Sharp | 364/200 |
| 3,792,448 | 2/1974 | Bennett | 364/200 |
| 3,876,987 | 4/1975 | Dalton | 364/200 |
| 3,882,455 | 5/1975 | Heck | 364/200 |
| 3,921,141 | 11/1975 | Wilber | 364/200 |
| 4,014,005 | 3/1977 | Fox | 364/200 |
| 4,030,074 | 6/1977 | Giorcelli | 364/200 |
| 4,056,844 | 11/1977 | Izumi | 364/200 |

Primary Examiner—James D. Thomas
Attorney, Agent, or Firm—Finnegan, Henderson, Farabow, Garrett & Dunner

[57] ABSTRACT

A dual data processing system comprising a first data processing unit having a first control unit and a first logic switching circuit; a second control unit having a second logic switching circuit; a pair of switch circuits coupled to the first and second logic switching circuits, respectively; adapter buffers to be coupled selectively to the first and second control units according to the operation of the switch circuits; a first power source for supplying electric power to the first control unit and the adapter buffers coupled thereto; and a second power source for supplying electric power to the second control unit and the adapter buffers coupled thereto. The switch circuits are operated to connect the adapter buffers selectively to the first and second control units so that load balance is kept between the first and second control units.

2 Claims, 4 Drawing Figures

DUAL DATA PROCESSING SYSTEM

BACKGROUND OF THE INVENTION

This invention relates to a dual data processing system which comprises a pair of control units, a plurality of adapter buffers and a pair of power sources and in which data are controlled in a specific manner.

A known data processing apparatus is provided with a pair of control circuits. In the event of failure of one control circuit, the other control circuit is brought into operation by software means, hardware means or manual operation so that the apparatus keeps processing data. Such known data processing apparatus, however, is provided with only one power source. Thus, if the power source fails by accident, the whole system is rendered inoperative. Two of such known data processing systems may be combined to constitute a dual data processing system so that if one system fails to work, the other continues the data processing. However, because it incorporates two data processing units, such a dual data processing system is massive and therefore occupies much room. Further, its maintenance cost is high and since the system has to be provided with comparator means to verify that the two units process the input data in the same manner, data processing efficiency for this system is extremely low.

SUMMARY OF THE INVENTION

An object of this invention is to provide a dual data processing system, maintainable at a low cost, which can process data at a high efficiency not only under normal conditions but in the event of trouble.

The dual data processing system according to this invention comprises a first control unit having a first logic switching circuit, a second control unit having a second logic switching circuit, a pair of switch circuits coupled to the first and second logic switching circuits, respectively, adapter buffers to be coupled selectively to the first and second control units according to the operation of the switch circuits, a first power source for supplying power to the first control unit and the adapter buffers coupled thereto, and a second power source for supplying power to the second control unit and the adapter buffers coupled thereto. The switch circuits are operated to connect the adapter buffers selectively to the first and second control units.

DETAILED DESCRIPTION OF THE PREFERRED EMBODIMENT

Figure 1:
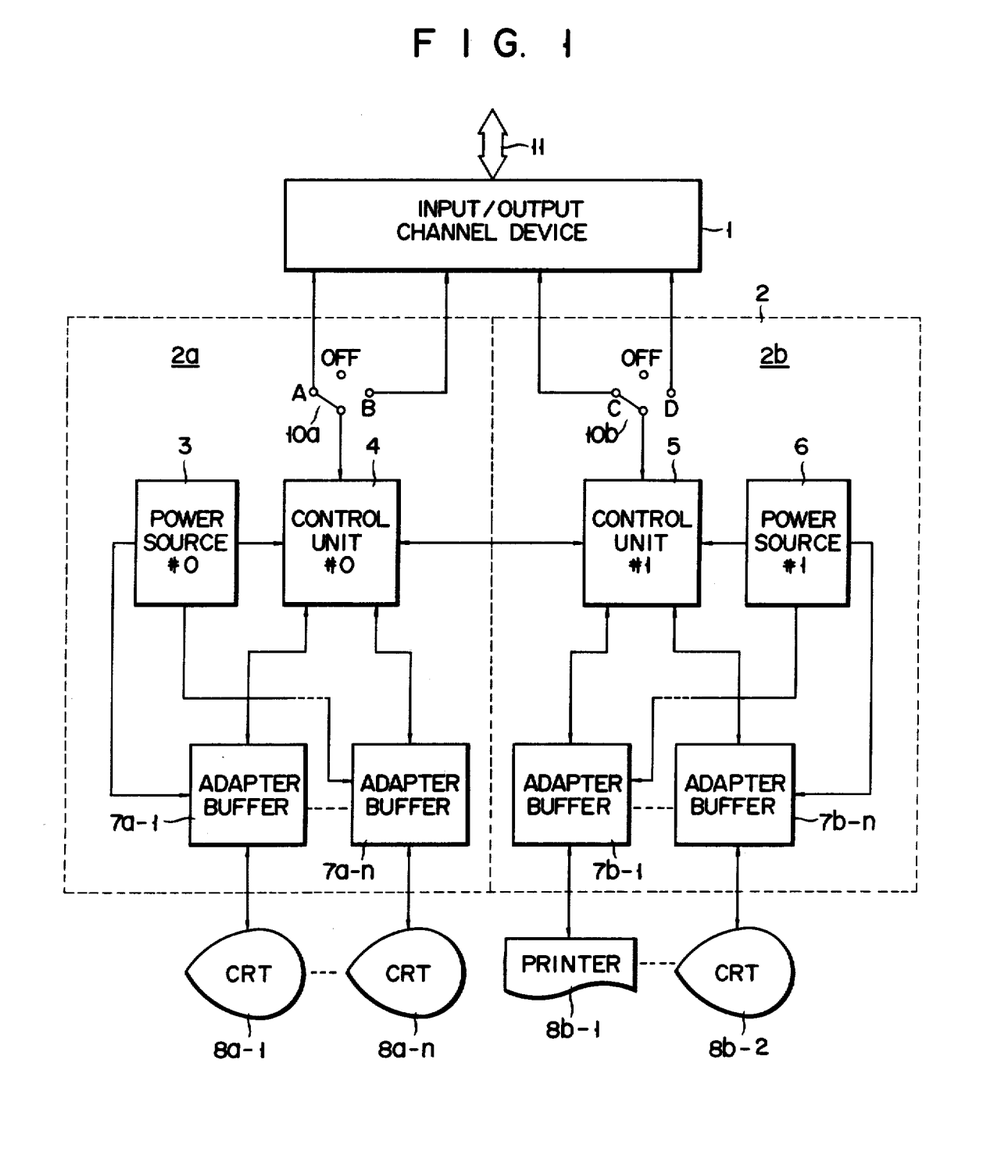
FIG. 1 is a block diagram of a dual data processing system according to this invention.

With reference to the accompanying drawings an embodiment of this invention will be described. As shown in FIG. 1, the dual data processing system 2 according to this invention comprises two data processing units 2a and 2b of substantially the same construction. The data processing unit 2a is comprises a power source (#0) 3, a control unit (#0) 4 supplied with power from the power source (#0) 3 and a plurality of adapter buffers 7a-1 to 7a-n coupled to the control unit (#0) 4 and supplied with power from the power source (#0) 3. To the adapter buffers 7a-1 to 7a-n there are connected a plurality of terminal devices, e.g., CRT display devices 8a-1 to 8a-n, respectively. The control unit (#0) 4 is connected to an external input/output channel device 1 through a switch 10a. Similarly, the data processing unit 2b is constituted by a power source (#1) 6, a control unit (#1) 5 supplied with power from the power source (#1) 6 and a plurality of adapter buffers 7b-1 to 7b-n coupled to the control unit (#1) 5 and supplied with power from the power source (#1) 6. The adapter buffers 7b-1 to 7b-n are connected to a plurality of terminal devices, e.g., a printer 8b-1 and CRT display device 8b-2, respectively. The control unit (#1) 5 is connected to the input/output channel device 1 through a switch 10b.

The input/output channel device 1 is connected to a central processing unit (not shown) through a data line 11, and data can be transferred between the device 1 and the central processing unit. The first control unit (#0) 4 and the second control unit (#1) 5 are connected to two flexible disc units (hereinafter described), respectively. The memory devices such as adapter buffers 7a-1 to 7a-n or RAMs (not shown) store data to be used in terminal devices such as CRT display devices 8a-1 to 8a-n.

Figure 2:
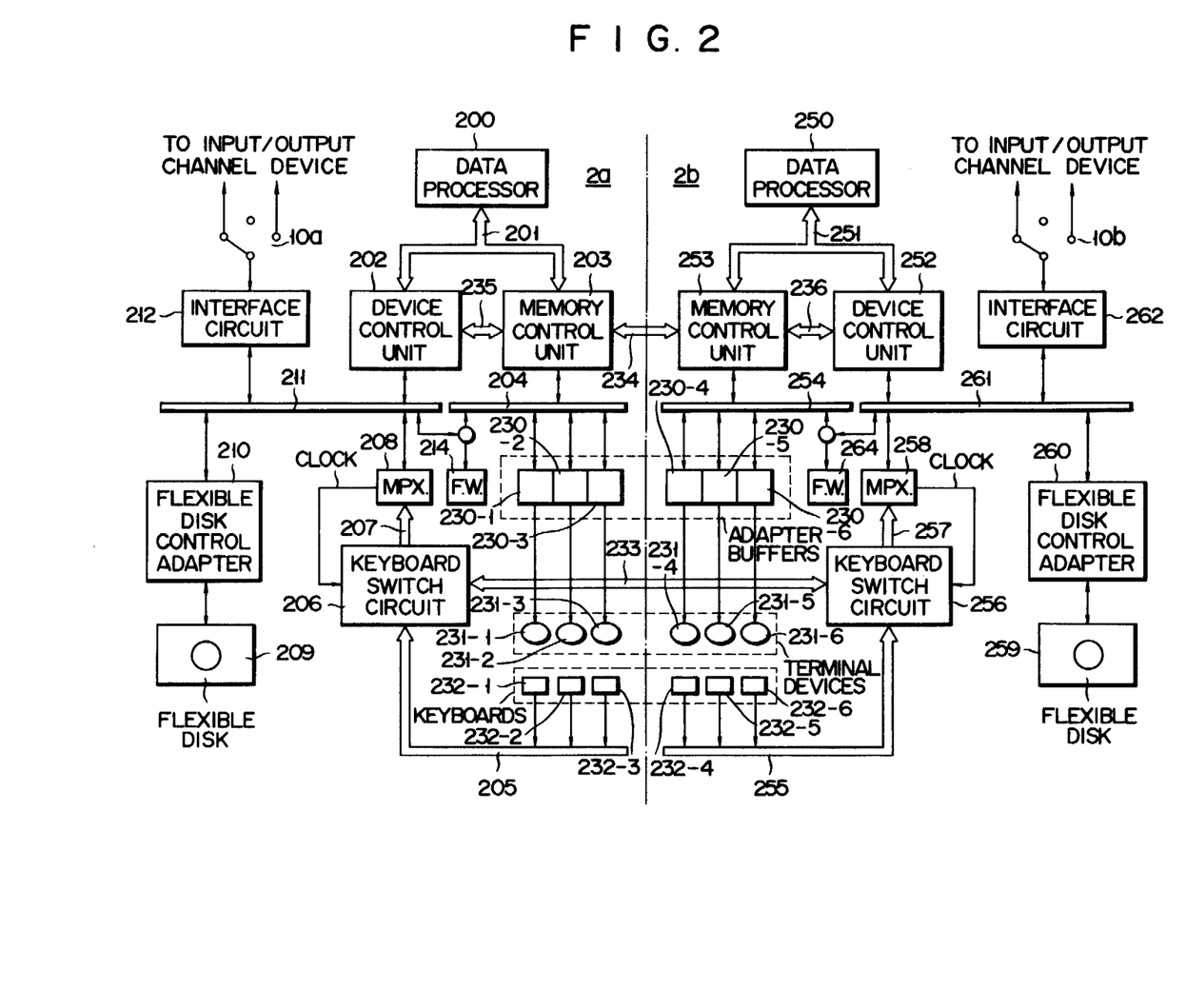
FIG. 2 is a block diagram showing in detail a part of the dual data processing system illustrated in FIG. 1.

With reference to FIG. 2, a detailed description will now be given of the first control unit (#0) 4, the second control unit (#1) 5, the adapter buffers 7a-1 to 7a-n, the adapter buffers 7b-1 to 7b-n, the terminal devices 8a-1 to 8a-n and the terminal devices 8b-1 to 8b-n.

In FIG. 2, the circuit elements on the left side of the dot-dash line, belong to the data processing unit 2a, and the circuit elements on the right side belong to the data processing unit 2b. The elements of the data processing unit 2a are arranged in symmetry to those of the data processing unit 2b.

In the data processing unit 2a, a data processor 200 is coupled to a device control unit 202 and a memory control unit 203 via a data bus 201. Thus data can be exchanged between the data processor 200 and the device control unit 202 and between the data processor 200 and the memory control unit 203. The memory control unit 203 is coupled via a data bus 204 to three adapter buffers 230-1 to 230-3. To these adapter buffers 230-1 to 230-3 there are coupled three terminal devices 231-1 to 231-3, respectively. Similarly, in the data processing unit 2b, a data processor 250 is coupled to a device control unit 252 and a memory control unit 253 through a data bus 251. Data can therefore be exchanged between the data processor 250 and the device control unit 252 and between the data processor 250 and the memory control unit 253. The memory control unit 253 is coupled via a data bus 254 to three adapter buffers 230-4 to 230-6. To these adapter buffers 230-4 to 230-6 there are coupled three terminal devices 231-4 to 231-6, respectively.

The terminal devices 231-1 to 231-6 are CRT display devices or printers. To these terminal devices 231-1 to 231-6 six keyboards 232-1 to 232-6 are connected, respectively. The keyboards 232-1 to 232-3 are connected to a keyboard-switching circuit 206 through a cable 205, and the other keyboards 232-4 to 232-6 to a keyboard switching circuit 256 through a cable 255. The keyboard switching circuit 206 of the data processing unit 2a is connected via a data bus 207 to a multiplexer circuit 208, and the keyboard switching circuit 256 of the data processing unit 2b is connected via a data bus 257 to a multiplexer circuit 258.

The data processing unit 2a is further provided with a flexible disk device 209 which is coupled through a flexible disk control adapter 210 to a data bus 211 and with an interface circuit 212 which is coupled via the switch 10a to the input/output channel device 1. Similarly, the data processing unit 2b is provided with a flexible disk device 259 which is connected through a flexible disk control adapter 260 to a data bus 261 and with an interface circuit 262 which is coupled via the switch 10b to the input/output channel device 1.

The keyboard-switching circuits 206 and 256 are connected to each other by a data bus 233, and data can be transferred between these circuits 206 and 256. The memory control units 203 and 253 are connected by a data bus 234, and data transfer can be carried out between these units 203 and 253. In the data processing unit 2a the device control unit 202 is coupled to the memory control unit 203 by a data bus 235. Similarly, in the data processing unit 2b the device control unit 252 is connected to the memory control unit 253 by a data bus 236. The data processing unit 2a is provided with a firmware memory 214 connected to the data buses 204 and 211. The data processing unit 2b is also provided with a firmware memory 264 connected to the data buses 254 and 261.

With reference to FIG. 2, it will be explained how the dual data processing system operates.

The memory control units 203 and 253, which control the output data to the terminal devices 231-1 to 231-6, each have a logic switch circuit (not shown in FIG. 2). The logic switch circuits of the units 203 and 253 cooperate to couple the adapter buffers 230-1 to 230-6 selectively to the memory control units 203 and 253. Thus, the logic switch circuits determine which one or ones of the terminal devices 231-1 to 231-6 will be coupled to the memory control unit 203 or 253. Accordingly, if the adapter buffer 230-1 is coupled to the memory control unit 203, the terminal device 231-1 functions in response to data from the memory control unit 203; if it is coupled to the memory control unit 253, the terminal device 231-1 functions in response to data from the memory control unit 253. It will be later described more in detail how the logic switch circuits operate, with reference to FIG. 3.

The keyboard-switching circuits 206 and 256 distribute input data from the keyboards 232-1 to 232-6 which correspond to the terminal devices 231-1 to 231-6, respectively. It will be described later more in detail how they work, with reference to FIG. 4.

The logic switch circuits have each a switch. Under normal operating conditions, the switches are operated to determine which one or ones of the adapter buffers 230-1 to 230-6 will be coupled to the memory control unit 203 or 253. Suppose the adapter buffers 230-1 to 230-4 are coupled to the memory control unit 203, and the remaining adapter buffers 230-5 and 230-6 to the memory control unit 253. Then, the output data to the terminal devices 231-1 to 231-3 are transferred from the memory control unit 203 through the data bus 204 and the adapter buffers 230-1 to 230-3. Input data fed to the terminal devices 231-1 to 231-3 from the corresponding key-boards 232-1 to 232-3 are transferred to the data processor 200 via the cable 205, the keyboard switch circuit 206, the data bus 207 and the multiplexer circuit 208 and also to the input/output channel device 1 via the interface circuit 212. At the same time, the output data to the terminal device 231-4 is farther transferred from the memory control unit 203 through the data bus 234, the memory control unit 253, the data bus 254 and the adapter buffer 230-4. Input data fed to the terminal device 231-4 through the corresponding keyboard 232-4 is transferred to the data processor 200 via the cable 255, the keyboard switch circuit 256, the data bus 233, the keyboard switch circuit 206, the data bus 207 and the multiplexer circuit 208 and also to the input/output channel device 1 via the interface circuit 212.

On the other hand, the output data to the terminal devices 231-5 and 231-6 are transferred from the memory control unit 253 through the data bus 254 and the adapter buffers 230-5 and 230-6. Input data are fed to the terminal devices 231-5 and 231-6 from the corresponding keyboards 232-5 and 232-6 are transferred to the data processor 250 via the cable 255, the keyboard switch circuit 256, the data bus 257 and the multiplexer circuit 258 and also to the input/output channel device 1 via the interface circuit 262.

Now with reference to FIG. 3, it will be described how the logic switch circuits operate to couple the adapter buffers 230-1 to 230-6 selectively to the memory control units 203 and 253. Here, the logic switch circuit of the data processing unit 2a is chiefly described since the data processing units 2a and 2b are of the same construction.

Figure 3:
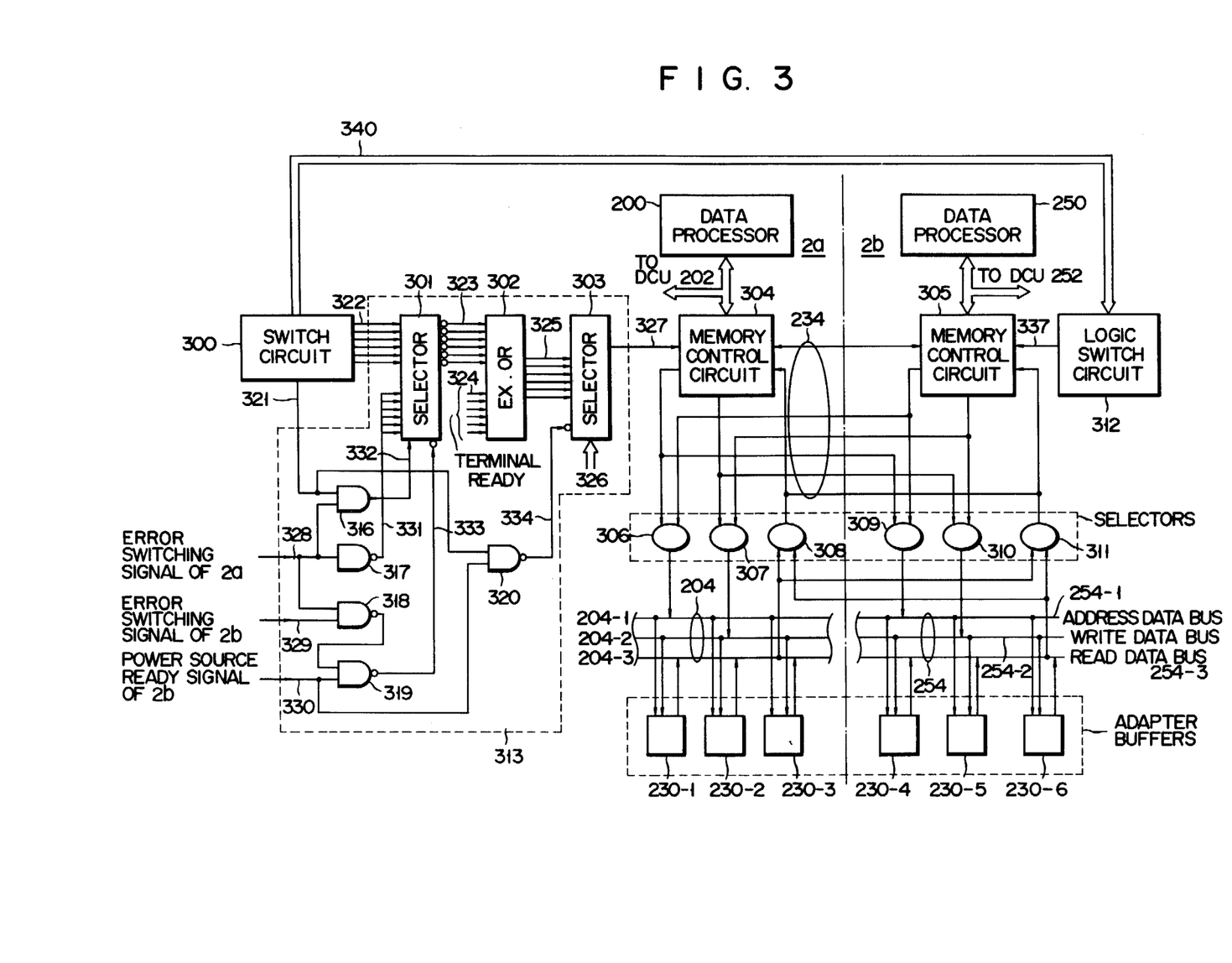
FIG. 3 is a block diagram showing in detail the part of the system of FIG. 2, including the memory control units and adapter buffers.

As shown in FIG. 3, the data processing units 2a and 2b are provided with logic switch circuits 313 and 312 of the same construction. The logic switch circuit 313 has a switch circuit 300 which is operated to determine which one or ones of the adapter buffers 230-1 to 230-6 will be coupled to the memory control unit 203 or 253. The switch circuit 300 is constituted by six changeover switches for designatng the adapter buffers 230-1 to 230-6, respectively and a changeover-enabling switch for enabling or disabling the six switches. The six switches in the enabled state can couple the corresponding adapter buffers 230-1 to 230-6 to the memory control unit 203 or 253. While put in the disabled state, they couple the adapter buffers 230-1 to 230-3 to the memory control unit 203 and the adapter buffers 230-4 to 230-6 to the memory control unit 253.

The logic switch circuit 313 is further provided with a selector 301, an exclusive OR circuit 302, another selector 303 and five gate circuits 316 to 320. The memory control units 203 and 253 are constituted by memory control circuits 304 and 305, respectively. These circuits 304 and 305 are coupled to six selectors 306 to 311. The data bus 204 is comprised of an address data bus 204-1, a write data bus 204-2 and a read data bus 204-3. Similarly, the data bus 254 consists of an address bus 254-1, a write data bus 254-2 and a read data bus 254-3. To these data buses 204-1, 204-2, 204-3, 254-1, 254-2 and 254-3 the selectors 306 to 311 and the adapter buffers 230-1 to 230-6 are connected in such manner as shown in FIG. 3.

A switching signal is supplied to the gate circuits 316, 317 and 318 via line 328. The signal normally has a binary value of "0"; its value changes to "1" when an error occurs in the data processing unit 2a. Another switching signal is supplied via line 329 to the gate circuit 318 only. This signal normally has a binary value of "0"; its value changes to "1" when an error occurs in the data processing unit 2b.

Under normal operating conditions, an operator sets the six changeover switches of the switch circuit 300 in order to couple the adapter buffers 230-1 to 230-6 selectively to the memory control circuits 304 and 305. The changeover-enabling switch of the switch circuit 300 is then operated, thus putting the six changeover switches into the enabled state, and produces an enabling signal on line 321 having a binary value of "1". At the same time, the six switches each produce a switching signal on the lines 322. Suppose the adapter buffers 230-1 to 230-4 are to be coupled to the data processing unit 2a and the remaining adapter buffers 230-5 and 230-6 are to be coupled to the data processing unit 2b. Then the four changeover switches corresponding to the buffers 230-1 to 230-4 produce four switching signals on the corresponding lines 322 having a binary value of "0", respectively, and the remaining two changeover switches corresponding to the buffers 230-5 and 230-6 produce two switching signals on lines 322 having a binary value of "1", respectively. All six switch signals on lines 322 are supplied to the selector 301 of the logic switch circuit 313. Simultaneously, these six switch signals are inverted and supplied to the logic switch circuit 312 of the data processing unit 2b through a data line 340. That is, the logic switch circuit 312 receives four switching signals having a binary value of "1" and two switching signals having a binary value of "0".

Meanwhile, the gate circuit 316 has been supplied with a switch signal on line 328 which has a binary value of "1". Thus, upon receipt of the enabling signal 321 having value of "1", gate 316 generates a select signal on line 332 which has a binary value of "1". This select signal is supplied to the selector 301. In response to the select signal the selector 301 inverts the six switch signals on lines 322 from the switch circuit 300, thus producing a binary code "111100". The binary code "111100" is supplied to the exclusive logic sum OR logic circuit 302. The exclusive OR circuit 302 is supplied with six terminal-ready signals on lines 324 which correspond to the terminal devices 231-1 to 231-6 (shown in FIG. 2), respectively and which show that the terminal devices 231-1 to 231-6 have been turned on. In the circuit 302 the switch signals presented on lines 323 from the selector 301 and the terminal-ready signals 324 undergo a logic addition to produce six terminal-selecting signals on output lines 325. More specifically, if the terminal devices 321-1 to 321-4 are prepared to operate and the corresponding terminal-ready signals on lines 324 have a binary value of "0", the exclusive OR circuit 302 generates terminal-selecting signals on lines 325 which select the adapter buffers 230-1 to 230-4 coupled to the terminal devices 231-1 to 231-4, respectively. Needless to say, the logic switch circuit 312 produces signals which select the adapter buffers 230-5 and 230-6 connected to the terminal device 231-5 and 231-6, respectively.

As mentioned above, the selective operation of the six changeover switches of the switch circuit 300 determines which one or ones of the adapter buffers 230-1 to 230-6 will be coupled to the memory control circuit 304 or 305. Each terminal-selecting signal on the lines 325 selects the corresponding adapter buffer when it has a binary value of "1".

The terminal-selecting signals are supplied to the selector 303. The selector is also supplied with adapter buffer number signals via line 326 which designate one or some of the adapter buffers 230-1 to 230-6, the contents of which are being processed by the data processor 200. In response to signals on line 326, the selector 303 produces a terminal-selecting signal on a line 327 (or signal line 325) which has a binary value of "1" and which corresponds to the adapter buffer designated by the signal on line 326. The terminal-selecting signal on line 327 is supplied to the memory control circuit 304. Similar terminal-selecting signals supplied on line 337 are produced by the logic switch circuit 312 and supplied to the memory control circuit 305. The total of signals on lines 327 and 337 is always six. Namely, if the six changeover switches of the switch circuit 300 are so operated to feed six terminal-selecting signals to the memory control circuit 304 to couple all the adapter buffers 230-1 to 230-6 to the memory control circuit 304 alone, no terminal-selecting signal is produced on line 337 by the logic switch circuit 312. The signals on line 327 supplied to the memory control circuit 304 are used to select one or some of the adapter buffers 320-1 to 320-6, which are to be accessed to the memory control circuit 304.

Now it will be explained how to write data into, and read data from, the adapter buffers 230-1 to 230-6. If the switch circuit 300 is so operated to couple, for example, the adapter buffer 230-1 to the memory control circuit 305, the adapter buffer 230-1 will be controlled by the memory control circuit 305. First, the memory control circuit 305 produces address data and write data. The address data is transferred to the adapter buffer 230-1 through the selector 306 and the address data bus 204-1, and the write data is supplied to the adapter buffer 230-1 through the selector 307 and the write data bus 204-2. On the other hand, the data read out from the adapter buffer 230-1 are supplied to the memory control circuit 305 through the read data bus 204-3 and the selector 311 and are ultimately processed by the data processor 250.

The selector 301 is enabled or disabled upon receipt of an enabling signal on line 333, and the selector 303 is enabled or disabled upon receipt of an enabling signal on line 334. The enabling signals are inverted signals. Thus, when they have a binary value of "0", the selectors 301 and 303 are enabled, and when they have a binary value of "1", the selectors 301 and 303 are disabled.

When the changeover-enabling switch is so operated as to disable the six switches, the switch circuit 300 produces an enabling signal on line 321 having a binary value of "0". This signal is fed to the gate circuit 316, which produces a select signal on line 332 having the binary value of "0", i.e. a logical product of the enabling signal on line 321 and the switch signal on line 328. The select signal 332 thus obtained is supplied to the selector 301. In response to the select signal 332 which has a binaly value of "0", the selector 301 selects one, some or all of six signals on lines 331 from the gate circuit 317 if it is put in the enabled state. If it is in the disabled state, the selector 301 selects the three signals on lines 331 which designate the adapter buffers 230-1 to 230-3 which belong to the data processing unit 2a in view of hardware. In this case the selector 301 produces six switch signals on lines 323 which form a binary code "111000", and the logic switch circuit 312 selects the adapter buffers 230-4 to 230-6 which are assigned to the data processing unit 2b.

The logic switch circuits 313 and 312 work as follows when an error occurs in the data processing unit 2a or 2b.

Upon detection of an error in the data processing unit 2a, the switch signal on line 328 assumes a binary value of "0". Thus, the gate circuit 316 generates a select signal on line 332 having a binary value of "0". In response to this select signal the selector 301 selects all six signals on lines 331 from the gate circuit 317 whose binary value is "1". These signals on lines 331 are inverted by the selector 301 into "0" switch signals on lines 323. As a result, none of the adapter buffers 230-1 to 230-6 is coupled to the data processing unit 2a. This is because if all six switch signals on lines 323 have a binary value of "0", the exclusive OR circuit 302 produces no switch signal on line 325 even if supplied with terminal-ready signals on lines 324 having a binary value of "0". In this case, the logic switch circuit 312 operates so as to couple all the adapter buffers 320-1 to 320-6 to the data processing unit 2b.

Upon detection of an error in the data processing unit 2b, the switch signal on line 328 assumes a binary value of "1". At this time the switch signal on line 328 has a binary value of "1" since the data processing unit 2a is operating normally. Upon receipt of the switch signals on lines 328 and 329, the gate circuit 318 supplies an output "0" to the gate circuit 319. The gate circuit 319 is supplied with a signal on line 330 which shows that the power source of the data processing unit 2b is prepared to supply power and which has a binary value of "1". The output "0" and the signal on line 330 undergo a logic multiplication, and the gate circuit 319 produces an output "0". This output "0" is inverted into an enabling signal on line 333 having a binary value of "1". This enabling signal disables the selector 301, and the selector 301 produces six switch signals on lines 323 all of which have a binary value of "1". Consequently, all the adapter buffers 230-1 and 230-6 are coupled to the data processing unit 2a. That is, if all the six switch signals on lines 323 from the selector 301 have a binary value of "1", the exclusive OR circuit 302 generates six switch signals of value "1" upon receipt of the terminal-ready signals (binary value "0") from the terminal devices 231-1 to 231-6. In response to the switch signals on lines 325 the selector 303 selects all the adapter buffers 230-1 to 230-6. Meanwhile, the logic switch circuit 312 works so as to couple none of the adapter buffers 230-1 to 230-6 to the data processing unit 2b.

In the event of failure of the power source 6 of the data processing unit 2b, the power source-ready signal on line 330 assumes a binary value of "0". Thus the enabling signal from the gate circuit 319 switches to a binary value of "1" and disables the selector 301. In this case, the selector 301 produces three "1" switch signals on lines 323 designating the adapter buffers 230-1 to 230-3 and three "0" switch signals designating the remaining adapter buffers 230-4 to 230-6. As a result, the adapter buffers 230-1 to 230-3 are coupled to the data processing unit 2a, and the adapter buffers 230-4 to 230-6 are coupled to the data processor unit 2b. The adapter buffers 230-4 to 230-6, however, are not operative since the power source 6 fails to supply power to them. On the other hand, if the power source 3 of the data processing unit 2a fails, the logic switch circuit 312 operates as does the logic switch circuit 313, thereby coupling the adapter buffers 230-4 to 230-6 to the data processing unit 2b and rendering the adapter buffers 230-1 to 230-3 inoperative.

The enabling signal on line 334 to the selector 303 becomes a "1" signal when the enabling signal on line 321 from the switch circuit 300 or the power source-ready signal on line 330 to the gate circuit 319 have a binary value of "0". The enabling signal on line 334 of value "1" disables the selector 303. In this case, the select signals on lines 327 from the selector 303 which designate the adapter buffers 230-4 and 230-5 become "0" signals. As a result, no data transfer can be carried out between the memory control circuit 304 and the adapter buffers 230-4 and 230-5.

Figure 4:
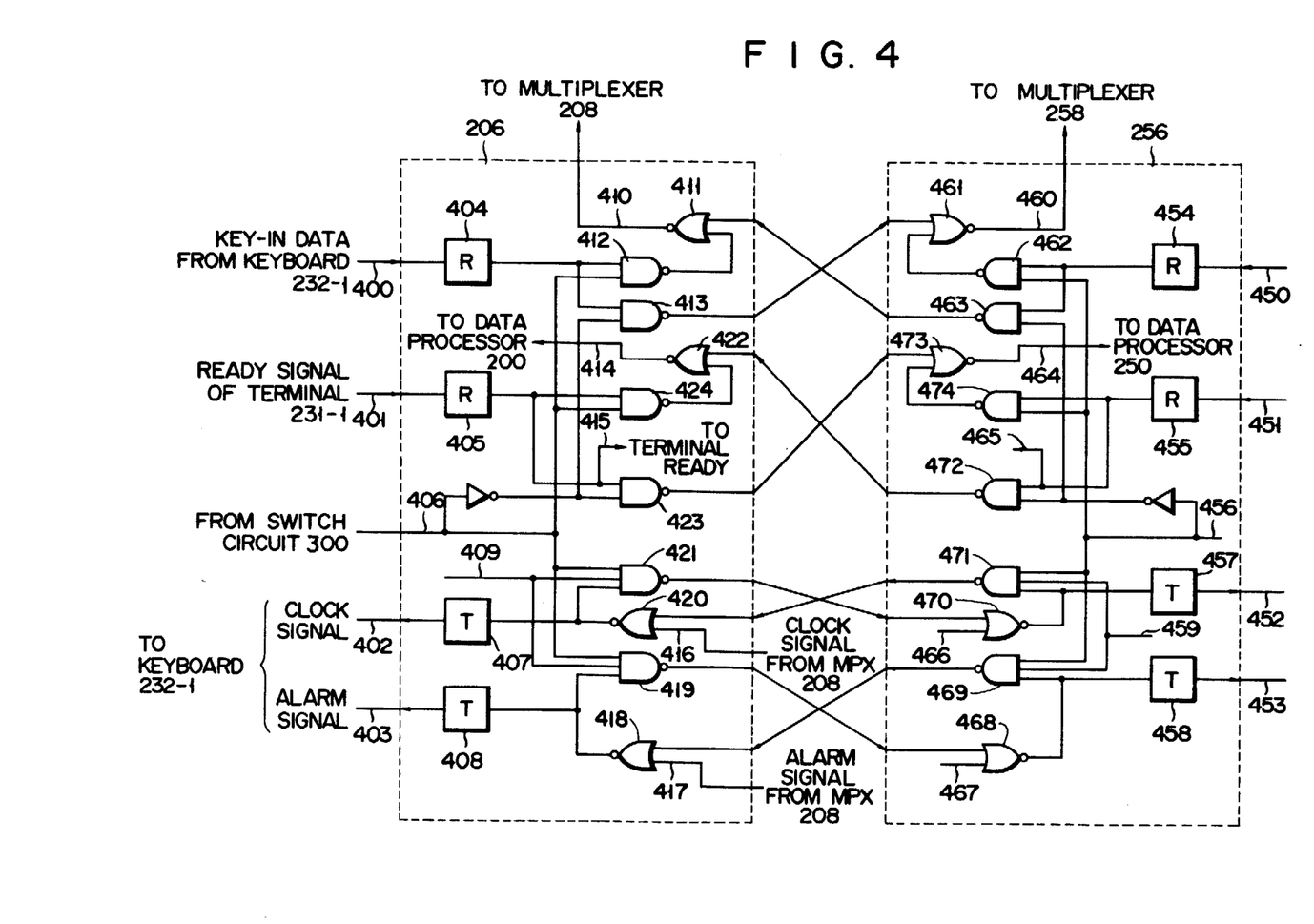
FIG. 4 is a circuit diagram showing the keyboard switch circuits illustrated in FIG. 2.

Now, with reference to FIG. 4, the keyboard-switching circuits 206 and 256 shown in FIG. 2 will be described.

Each keyboard-switching circuit 206 and 256 comprises six sections including terminal devices so that each circuit can be coupled to one or more of the keyboards 232-1 to 232-6, respectively. Here, to simplify the description, only the switching section corresponding to the keyboard 232-1 is illustrated in FIG. 4.

The keyboard-switching circuit 206 comprises an input data line 400 through which data are supplied from the keyboard 232-1, a terminal-ready signal line 401 through which is applied a signal showing that the terminal device 231-1 has been turned on, a clock signal line 402 through which a clock signal is supplied to the keyboard 232-1 and an alarm signal line 403 through which an alarm signal is supplied to the keyboard 232-1. The keyboard-switching circuit 206 is further provided with a receiver 404 for receiving input data from the keyboard 232-1, a receiver 405 for receiving a terminal-ready signal from the keyboard 232-1, a switch signal line 406, a transmitter 407 for transmitting a clock signal to the keyboard 232-1 through the clock signal line 402 and a transmitter 408 for transmitting an alarm signal through the alarm signal line 403. Further, the keyboard-switching circuit 206 comprises a terminal-ready signal line 409, a data line 410, gate circuits 411, 412 and 413, a terminal-ready signal line 414 coupled to the data processor 200 (FIG. 2), a terminal-ready signal line 415, a clock signal line 416 coupled to the multiplexer circuit 208 (FIG. 2), an alarm signal line 417 coupled to the multiplexer circuit 208 and seven gate circuit 418 to 424.

The keyboard-switching circuit 256 comprises elements which are similar to, and arranged in symmetry with, those of the keyboard-switching circuit 206. That is, it comprises an input data line 450 for supplying data from the keyboard 232-4, a terminal-ready signal line 451 for applying a signal showing that the terminal device 231-4 is ready to work, a clock signal line 452 for supplying a clock signal to the keyboard 232-4 and an alarm signal line 453 for supplying an alarm signal to the keyboard 232-4. The keyboard-switching circuit 256 is further provided with a receiver 454 for receiving input data from the keyboard 232-4, another receiver 455 for receiving a terminal-ready signal from the keyboard 232-4, a switch signal line 456, a transmitter 457 for transmitting a clock signal to the keyboard 232-4 through the clock signal line 452 and another transmitter 458 for transmitting an alarm signal through the alarm signal line 453. Further it comprises a terminal-ready signal line 459, a data line 460, gate circuits 461, 462 and 463, a terminal-ready signal line 464 coupled to the data processor 250 (FIG. 2), a terminal-ready signal line 465, a clock signal line 466 coupled to the muliplexer circuit 258 (FIG. 2), an alarm signal line 467 coupled to the multiplexer circuit 258 and seven gate circuits 468 to 474.

The keyboard-switching circuits 206 and 256 have six terminals to be coupled to the keyboards 232-1 to 232-6, respectively. In practice, the keyboards 232-1 to 232-3 are connected to the three terminals of the keyboard-switching circuit 206, and the keyboards 232-4 to 232-6 are connected to the three terminals of the keyboard-switching circuit 256. Thus, input data and a terminal-ready signal from the keyboard 232-1 are not normally supplied to the keyboard-switching circuit 256. But if the keyboard 232-1 is disconnected from the keyboard-switching circuit 206 and is connected to the keyboard-switching circuit 256 instead, the circuit 256 comes into operation for the keyboard 232-1. In this case the keyboard-switching circuit 206 does not work at all for the keyboard 232-1.

It will now be explained how the keyboard-switching circuit 206 operates. Since the keyboard-switching circuit 256 operates in exactly the same way, its operation is not described.

The keyboard-switching circuit 206 is set in the disabled state if the terminal-ready signal coming through the signal line 409 has a binary value of "0". This terminal-ready signal has been generated by the changeover-enabling switch of the switch circuit 300 shown in FIG. 3. Once the keyboard-switching circuit 206 has been placed into the disabled state, the keyboard switching circuit 256 is disconnected from the circuit 206. The data from the keyboard 232-1 are therefore transferred to the multiplexer circuit 208 through the data line 410. At the same time, the terminal-ready signal, which shows that the terminal device 231-1 is set in operative condition, is supplied to the exclusive OR circuit 302 (FIG. 3) via the terminal-ready signal line 415 and transferred to the data processor 200 through the terminal-ready signal line 414. Further, the clock signal from the multiplexer circuit 208 is transferred to the keyboard 232-1 via the clock signal line 402, and the alarm signal from the multiplexer circuit 208 to the keyboard 232-1 via the alarm signal line 403. So long as the keyboard-switching circuit 206 stays in the disabled state, the sections corresponding to the keyboards 232-2 and 232-3 operate just as does the section corresponding to the keyboard 232-1.

When the terminal-ready signal coming through the signal line 409 assumes a binary value of "1", the keyboard-switching circuit 206 is switched to the enabled state. Then, the input data from the keyboard 232-1 are transferred to the multiplexer circuit 208 or 258 according to the switch signal supplied through the switch signal line 406. This switch signal has been generated by the changeover switch of the switch circuit 300, which corresponds to the adapter buffer 230-1. If the switch signal supplied via the switch signal line 406 is to couple the adapter buffer 230-1 to the data processing unit 2a, the data from the keyboard 232-1 will be transferred to the multiplexer circuit 208 through the gate circuits 412 and 411. The terminal-ready signal, which shows that the terminal device 231-1 is set in operative condition, is supplied to the data processor 200 via the gate circuits 424 and 422 and the terminal-ready signal line 414 and supplied also to the exclusive OR circuit 302 through the terminal-ready signal line 415.

On the other hand, if the switch signal supplied via the switch signal line 406 is to couple the adapter buffer 230-1 to the data processing unit 2b, the data from the keyboard 232-1 will be transferred to the multiplexer 258 through the gate circuits 413 and 461. Namely, the data from the keyboard 232-1 will be transferred to the multiplexer 258 of the data processing unit 2b to which the adapter buffer 230-1 is coupled. In this case, the terminal ready signal, which shows that the terminal device 231-1 is set in operative condition, is supplied to the data processor 250 through the gate circuits 423 and 473 and the terminal-ready signal line 464 and also to the logic switch circuit 312 through the terminal-ready signal line 415.

In the four other sections corresponding to the keyboards 232-2 to, 3, -5, and -6 (not shown in FIG. 4), the same operation is carried out as mentioned above and as in the section corresponding to the keyboard 232-1. Thus, the keyboards 232-1 to 232-6 are selectively coupled to the data processing units 2a and 2b according to the switch operation in the switch circuit 300, in the same manner as are the corresponding data buffers 230-1 to 230-6.

Now it will be described how to use effectively the dual data processing system according to this invention.

First, it will be explained how one of the data processing units 2a and 2b processes data, while the other is executing diagnostic programs, for example. If the data processing unit 2a is to process data and the data processing unit 2b is to execute the diagnostic programs, the six changeover switches of the switch circuit 300 are so operated as to couple all the adapter buffers 230-1 to 230-6 to the data processing unit 2a. As a result, the data processing unit 2a processes data while the adapter buffers 230-1 to 230-6 are controlled by the memory control unit 203 (FIG. 2), and the data processing unit 2b executes the diagnostic programs. The diagnostic programs may be executed in on-line fashion in response to instructions from an external data-processing unit. Alternatively, they may be loaded into the firmware memory 264 from the flexible disk device 259 via the flexible disk control adapter 260 and then be executed in off-line fashion.

Now it will be explained how the adapter buffers 230-1 to 230-6 are disconnected from one data processing unit and connected to the other in case the first-mentioned data processing unit develops a problem, although its logic switch circuit works well. Suppose a parity error occurs in the data processing unit 2a and the subsequent re-try of data transfer fails, or the central processing unit connected to the dual data processing system in on-line fashion detects an error in the data processing unit 2a and the diagnostic programs are executed to find the error. Then, the data processor 200 automatically operates to disconnect all the adapter buffers 230-1 to 230-6 from the data processing unit 2a and couple the same to the data processing unit 2b which is operating properly (see FIG. 3). Consequently, the data processing is effected continuously by the data processing unit 2b. Specific problems, in the data processing unit 2a may be detected by the operator. Upon recognizing such problems, the operator manually operates the six changeover switches of the switch circuit 300 so as to disconnect all the adapter buffers 230-1 to 230-6 from the data processing unit 2a and connect them to the data processing unit 2b.

If one of the logic switch circuits 313 or 312 fails to operate, the changeover-enabling switch of the switch circuit 300 is operated so as to disable the six changeover switches provided also in the switch circuit 300. In this case, the adapter buffers 230-1 to 230-3 are controlled by the memory control unit 203 and the adapter buffers 230-4 to 230-6 by the memory control unit 253, thereby to effect data processing, since the adapter buffers 230-1 to 230-3 are coupled to the data processing unit 2a and the remaining ones 230-4 to 230-6 to the data processing unit 2b as shown in FIG. 2.

Suppose the memory control unit 253 fails to work, while both keyboard switching circuits 206 and 256 work normally and it is possible to transfer the input data from the keyboards 232-4 to 232-6 to the data processing unit 2a. In this case, the wiring board including the adapter buffers 230-4 to 230-6 is pulled out of the data processing unit 2b and put into the data processing unit 2a, thereby connecting the adapter buffers 230-4 to 230-6 physically as well as electrically to the data processing unit 2a. Then, like the other adapter buffers 230-1 to 230-3, the adapter buffers 230-4 to 230-6 are connected to the memory control unit 203 through the data bus 204 and continue to process data.

Suppose the keyboard switching circuit 206 fails, thereby making it impossible to transfer the input data from the keyboard 232-1 to 232-3 to the data processing unit 2a. Then, the changeover-enabling switch of the switch circuit 300 is operated so as to put both keyboard switching circuits 206 and 256 into disabled state. Thus, the adapter buffers 230-1 to 230-3 are controlled by the memory control unit 203 and the adapter buffers 230-4 to 230-6 by the memory control unit 253, just as in case the logic switch circuit 313 or 312 fails to operate.

In the event of the failure of one power source, for example, the power source 3 shown in FIG. 1, all the elements of the data processing unit 2a cannot operate at all. If this is the case, the elements of the data processing unit 2b, which are supplied with power from the power source 6, cooperate with the terminal devices 231-4 to 231-6 to process data. Thus, data can be processed continuously in spite of the failure of the power source 3 of the data processing unit 2a.

As mentioned above in detail, the dual data processing system can continue to process data in the event of various troubles and is therefore highly reliable. Provided with two power sources, the system can process data continuously even if one of the power sources fails to work.

What we claim is:

1. In a data processing system including first and second data processing units having individual power source means associated therewith and a plurality of terminal devices adapted to be coupled to receive data from and transmit data to said first and second data processing units, configuration control means comprising, in combination:

first control means connected for channelling data to and from said first data processing unit;

second control means connected for channelling data to and from said second data processing unit;

adapter means associated with each said terminal device for supplying data thereto; and selector means for selectively coupling said adapter means to said first and second control means, said selector means including manually operable switch means for controlling said selector means to generate a first set of output signals, each said output signal designating a particular control means for connection to a particular adapter means, means responsive to said output signals to couple the designated control means and adapter means to channel data between said data processing units and said terminal devices, first logic switch means responsive to an error condition detected in one of said data processing units for overriding said manually operable switch means to cause said selector means to generate a second set of output signals designating the connection of all of said adapter means to the control means connected to the other of said data processing units, and second logic switch means responsive to a failure of one of said power source means for overriding said manually operable switch means and said first logic switch means to cause said selector means to generate a third set of output signals designating the connection of said adapter means in equal proportion to said first and second control means.

2. The data processing system set forth in claim 1, further comprising:

keyboard input means provided for each of said terminal devices to enable manual entry of data at each said device;

means for channelling data from said keyboard input means to said first and second data processing units; and means controlled by said selector means to cause said last-mentioned means to couple each said keyboard input means to a particular data processing unit in accordance with the connection designated for the associated adapter means, whereby the data developed at each associated adapter means, terminal device, and keyboard input means is processed by the same data processing unit.

* * * * *